(12) United States Patent
Ohkita

(10) Patent No.: US 7,904,593 B2
(45) Date of Patent: Mar. 8, 2011

(54) COMMUNICATION APPARATUS

(75) Inventor: Hideki Ohkita, Kunitachi (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 184 days.

(21) Appl. No.: 12/277,049

(22) Filed: Nov. 24, 2008

(65) Prior Publication Data

US 2009/0271530 A1 Oct. 29, 2009

(51) Int. Cl.
*G06F 15/16* (2006.01)
*G06F 12/00* (2006.01)

(52) U.S. Cl. .................................. 709/245; 709/250

(58) Field of Classification Search .......... 709/221–229, 709/231, 236, 250, 245
See application file for complete search history.

(56) References Cited

U.S. PATENT DOCUMENTS

| | | | |
|---|---|---|---|
| 7,130,424 B2 | 10/2006 | Marshall | |
| 2005/0091375 A1 | 4/2005 | Straub et al. | |
| 2005/0136990 A1 | 6/2005 | Hardacker et al. | |
| 2005/0201391 A1* | 9/2005 | Ma et al. ..................... | 370/401 |
| 2006/0288373 A1 | 12/2006 | Grimes et al. | |
| 2007/0223417 A1* | 9/2007 | Taki ............................ | 370/328 |
| 2008/0005290 A1* | 1/2008 | Nykanen et al. ............. | 709/222 |
| 2008/0144612 A1* | 6/2008 | Honkasalo et al. .......... | 370/370 |
| 2008/0320127 A1* | 12/2008 | Fries ............................ | 709/224 |
| 2009/0088104 A1* | 4/2009 | Cheng et al. ................. | 455/130 |
| 2009/0210539 A1* | 8/2009 | Funabiki et al. ............. | 709/228 |

FOREIGN PATENT DOCUMENTS

| | | |
|---|---|---|
| JP | 2008-22560 | 1/2008 |
| WO | 2007/091706 A1 | 8/2007 |
| WO | WO 2007136038 | 11/2007 |

OTHER PUBLICATIONS

Japanese Patent Application No. 2008-117786 Notice of Reasons for Rejection mailed Jan. 27, 2009 (English Translation).

* cited by examiner

*Primary Examiner* — Zarni Maung
(74) *Attorney, Agent, or Firm* — Blakely Sokoloff Taylor & Zafmann, LLP

(57) ABSTRACT

According to one embodiment, a communication apparatus includes a first communication module configured to communicate with at least one partner device by a first communication scheme, a second communication module configured to communicate with at least one partner device by a second communication scheme, and an address management module configured to assign an address value for the second communication scheme to at least one partner device connected via the second communication module based on the address value for the first communication scheme of the self device, which is assigned based on an address value assignment scheme defined by the first communication scheme.

8 Claims, 9 Drawing Sheets

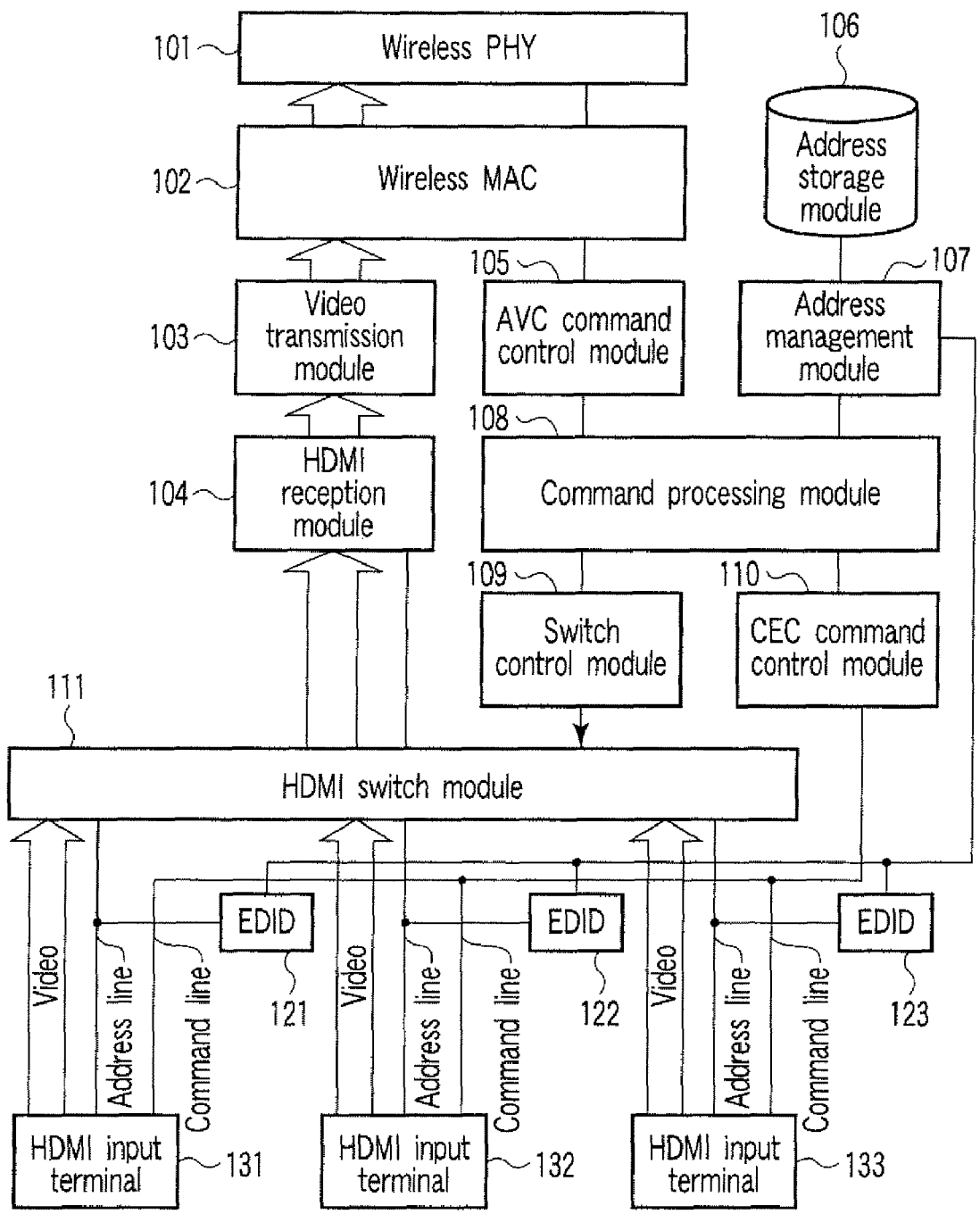
F I G. 1

| No | Mac Address | STID | PA |
|---|---|---|---|
| 1 | 000039AA : AAAAAAAA : AAAAAAAA | 0x03 | 1.0.0.0 |
| 2 | 000039BB : BBBBBBBB : BBBBBBBB | 0x2F | 2.0.0.0 |
| 3 | 000039CC : CCCCCCCC : CCCCCCCC | 0x01 | 3.0.0.0 |
| 4 | 000039DD : DDDDDDDD : DDDDDDDD | 0x1F | 4.0.0.0 |

US 7,904,593 B2

COMMUNICATION APPARATUS

CROSS-REFERENCE TO RELATED APPLICATIONS

This application is based upon and claims the benefit of priority from Japanese Patent Application No. 2008-117786, filed Apr. 28, 2008, the entire contents of which are incorporated herein by reference.

BACKGROUND

1. Field

One embodiment of the invention relates to a communication apparatus which supports two different communication schemes and, for example, a communication apparatus having a wireless communication interface and HDMI (High Definition Multimedia Interface).

2. Description of the Related Art

In recent years, digital devices equipped with HDMI, such as a TV, DVD player, and DVD recorder, are becoming popular. Jpn. Pat. Appln. KOKAI Publication No. 2008-22560 discloses a wireless communication technique for a CEC (Consumer Electronics Control) message defined by the HDMI standard.

That is, the recent digital devices have a variety of communication schemes. A digital device can communicate with a partner device by a cable via HDMI and with another partner device via wireless communication. The advent of such digital devices supporting two different communication schemes has brought various possible connection forms of digital devices.

For example, a first device is connected to a second device via HDMI. The second device is connected to a third device via wireless communication. The third device is connected to fourth and fifth devices via HDMI.

In this connection form, however, it is difficult to appropriately assign addresses for the communication scheme via HDMI. This is because the connection form includes wireless communication which is based on a communication scheme different from that via HDMI.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 1 is a block diagram showing the schematic arrangement of a transmission apparatus included in a communication apparatus according to an embodiment of the invention;

DETAILED DESCRIPTION

Figure 2:
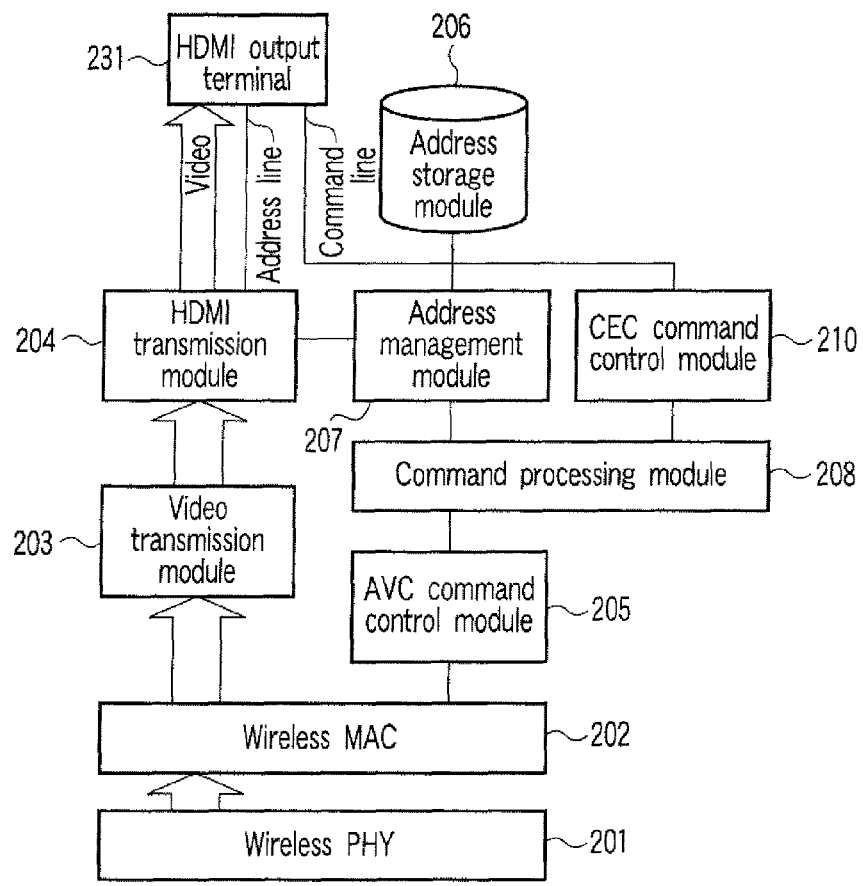
FIG. 2 is a block diagram showing the schematic arrangement of a reception apparatus included in the communication apparatus according to the embodiment.

Various embodiments according to the invention will be described hereinafter with reference to the accompanying drawings. In general, communication apparatus according to one embodiment of the invention comprises a first communication module configured to communicate with at least one partner device by a first communication scheme, a second communication module configured to communicate with at least one partner device by a second communication scheme and an address management module configured to assign an address value for the second communication scheme to the at least one partner device connected via the second communication module based on an address value for the first communication scheme of a self device, which is assigned based on an address value assignment scheme defined by the first communication scheme.

FIG. 1 is a block diagram showing the schematic arrangement of a transmission apparatus included in a communication apparatus according to an embodiment of the present invention. As shown in FIG. 1, the transmission apparatus includes a wireless PHY 101, wireless MAC 102, video transmission module 103, HDMI reception module 104, AVC command control module 105, address storage module 106, address management module 107, command processing module 108, switch control module 109, CEC command control module 110, HDMI switch module 111, EDID 121, EDID 122, EDID 123, HDMI input terminal 131, HDMI input terminal 132, and HDMI input terminal 133.

The HDMI switch module 111 selects one of input signals including video signals and address signals input from the video lines and address lines of the HDMI input terminals 131, 132, and 133 and transmits it to the HDMI reception module 104. The HDMI reception module 104 transmits the video signal to the video transmission module 103. The video transmission module 103 converts the video signal into a packet format capable of wirelessly transmitting a video signal and sends the packet to the wireless MAC 102. The wireless MAC 102 transmits the video packet to the wireless PHY 101. The wireless PHY 101 wirelessly outputs the video packet.

All command signals input from the command lines of the HDMI input terminals 131, 132, and 133 are transmitted to the CEC command control module 110 without intervening the HDMI switch module 111. The CEC command control module 110 transmits each command received via a command line to the command processing module 108. The CEC command control module 110 also transmits a command to a command line in accordance with an instruction from the command processing module 108. The command processing module 108 processes a command received from the CEC command control module 110 or AVC command control module 105 and outputs an instruction to the AVC command control module 105, CEC command control module 110, switch control module 109, and address management module 107 in accordance with the process contents. The switch control module 109 controls the HDMI switch module 111 in accordance with an instruction from the command processing module 108. The address management module 107 sets HDMI physical address values in the EDIDs 121, 122, and 123 and manages the address storage module 106 in accordance with an instruction from the command processing module 108. The address storage module 106 stores address contents. The EDIDs include information such as addresses to be sent to devices connected to the HDMI input terminals 131, 132, and 133. The AVC command control module 105 transmits a command to the wireless MAC 102 or transmits the contents of a received AVC command to the command processing module 108 in accordance with an instruction from the command processing module 108. The wireless MAC 102 processes MAC layers of wireless transmission. The wireless PHY 101 processes physical layers of wireless transmission.

FIG. 2 is a block diagram showing the schematic arrangement of a reception apparatus included in the communication apparatus according to the embodiment of the present invention. As shown in FIG. 2, the reception apparatus includes a wireless PHY 201, wireless MAC 202, video transmission module 203, HDMI transmission module 204, AVC command control module 205, address storage module 206, address management module 207, command processing module 208, CEC command control module 210, and HDMI output terminal 231.

The wireless PHY 201 receives a video packet wirelessly and transmits it to the wireless MAC 202, and also processes physical layers of AVC command transmission/reception. The wireless MAC 202 sends the video packet to the video transmission module 203. The video transmission module 203 converts the received video packet into a video signal and transmits it to the HDMI transmission module 204. The HDMI transmission module 204 outputs the received video signal to the HDMI output terminal 231. The AVC command control module 205 performs AVC command transmission/reception processing in accordance with an instruction from the command processing module 208 or a notification from the wireless MAC 202. The command processing module 208 processes a command received from the CEC command control module 210 or AVC command control module 205 and outputs an instruction to the address management module 207, CEC command control module 210, and AVC command control module 205 as needed. The CEC command control module 210 transmits a CEC command to the command line or sends a CEC command received from the command line to the command processing module 208 in accordance with an instruction from the command processing module 208. The address management module 207 performs address processing based on an instruction from the command processing module 208 or an HDMI physical address value contained in the EDID of a device connected to the HDMI output terminal 231, which is received via the address line of the HDMI transmission module 204, and records the result in the address storage module 206.

A communication apparatus including a transmission apparatus and a reception apparatus has been described above. However, the communication apparatus of the present invention is not limited to this. For example, the above-described transmission apparatus can be regarded as a communication apparatus from the viewpoint of only information transmission processing. Alternatively, the above-described reception apparatus can be regarded as a communication apparatus from the viewpoint of only information reception processing.

Figure 3:
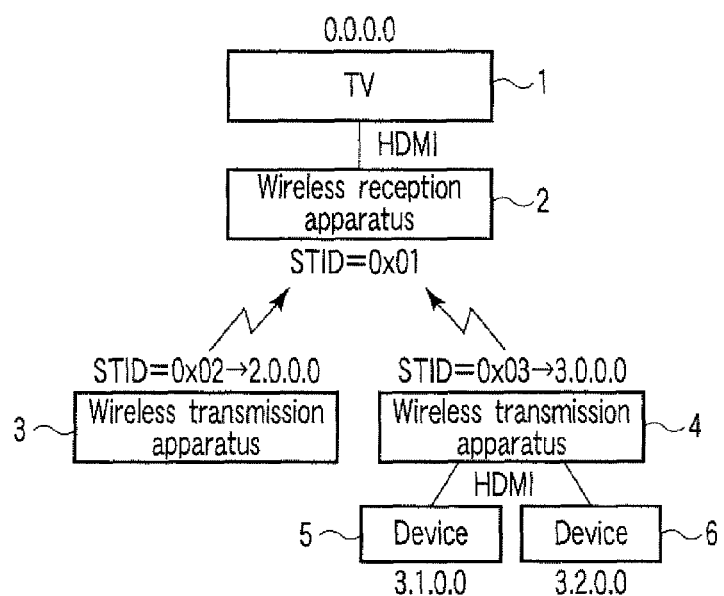
FIG. 3 is a view showing the schematic arrangement of a communication system using the communication apparatus according to the embodiment.

FIG. 3 is a view showing the schematic arrangement of a communication system using the communication apparatus according to the embodiment of the present invention. As shown in FIG. 3, the communication system includes, e.g., a TV 1, wireless reception apparatus 2, wireless transmission apparatus 3, wireless transmission apparatus 4, device 5, and device 6.

Address values called station IDs (STIDs) are set in the wireless reception apparatus 2 and the wireless transmission apparatuses 3 and 4 to enable communication between the wireless devices. An STID takes a value from 0x00 to 0x3D. The wireless devices have an HDMI input terminal or an HDMI output terminal and are connected to the TV and various devices via HDMI cables. The TV and devices having HDMI terminals are given HDMI physical addresses. An HDMI physical address is contained in an EDID and transmitted from the downlink (video signal receiving side) to the uplink (video signal transmitting side) via an address line.

Figure 4A:
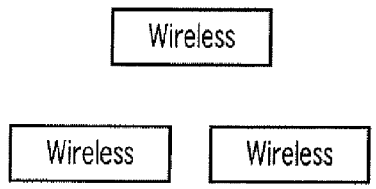
FIG. 4A is a view showing a communication system including only wireless devices called Native according to the embodiment.
Figure 4B:
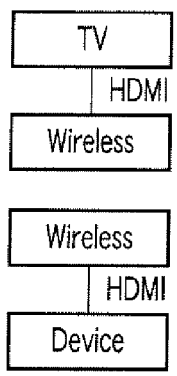
FIG. 4B is a view showing a communication system including a pair of wireless devices called Pass Through according to the embodiment.

FIG. 4A is a view showing an example of a communication system including only wireless devices called Native. FIG. 4B is a view showing an example of a communication system including a pair of wireless devices called Pass Through. The communication system shown in FIG. 4A includes no HDMI device, and therefore, no address is assigned for HDMI communication. In the communication system shown in FIG. 4B, HDMI devices are connected via the pair of wireless devices called Pass Through. In this case, the connected HDMI devices are in a one-to-one correspondence. Hence, address assignment for HDMI communication is relatively easy.

In a communication system in which one HDMI device is connected to a plurality of HDMI devices via wireless devices, as shown in FIG. 3, address assignment for HDMI communication is not easy, unlike the communication system in FIG. 4B. Address management in this communication system will be described below.

Figure 5:
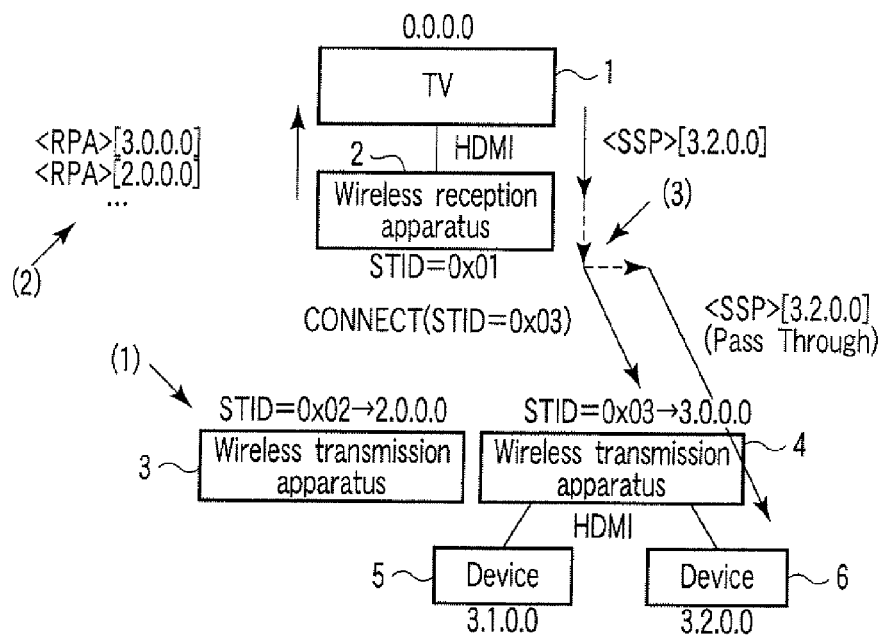
FIG. 5 is a view showing the schematic arrangement of a communication system using the communication apparatus according to the embodiment.

FIG. 5 is a view showing the schematic arrangement of a communication system using the communication apparatus according to the embodiment of the present invention. As shown in FIG. 5, the communication system includes, e.g., the TV 1, wireless reception apparatus 2, wireless transmission apparatus 3, wireless transmission apparatus 4, device 5, and device 6. Address processing and path switching processing will be described with reference to FIG. 5. The communication apparatus according to the embodiment of the present invention is applicable to any one of the wireless reception apparatus 2 and the wireless transmission apparatuses 3 and 4.

The communication apparatus has a module (1) which assigns HDMI physical addresses to wireless transmission apparatuses including wireless devices (Native), a module (2) which sends each assigned HDMI physical address via HDMI, and a module (3) which switches the path in the wireless section in accordance with a path switching request from HDMI. For example, the address management modules 107 and 207 serve as these modules. This enables connection of a plurality of wireless devices including wireless devices (Native) and wireless devices (Pass Through), and path switching processing.

Figure 6:
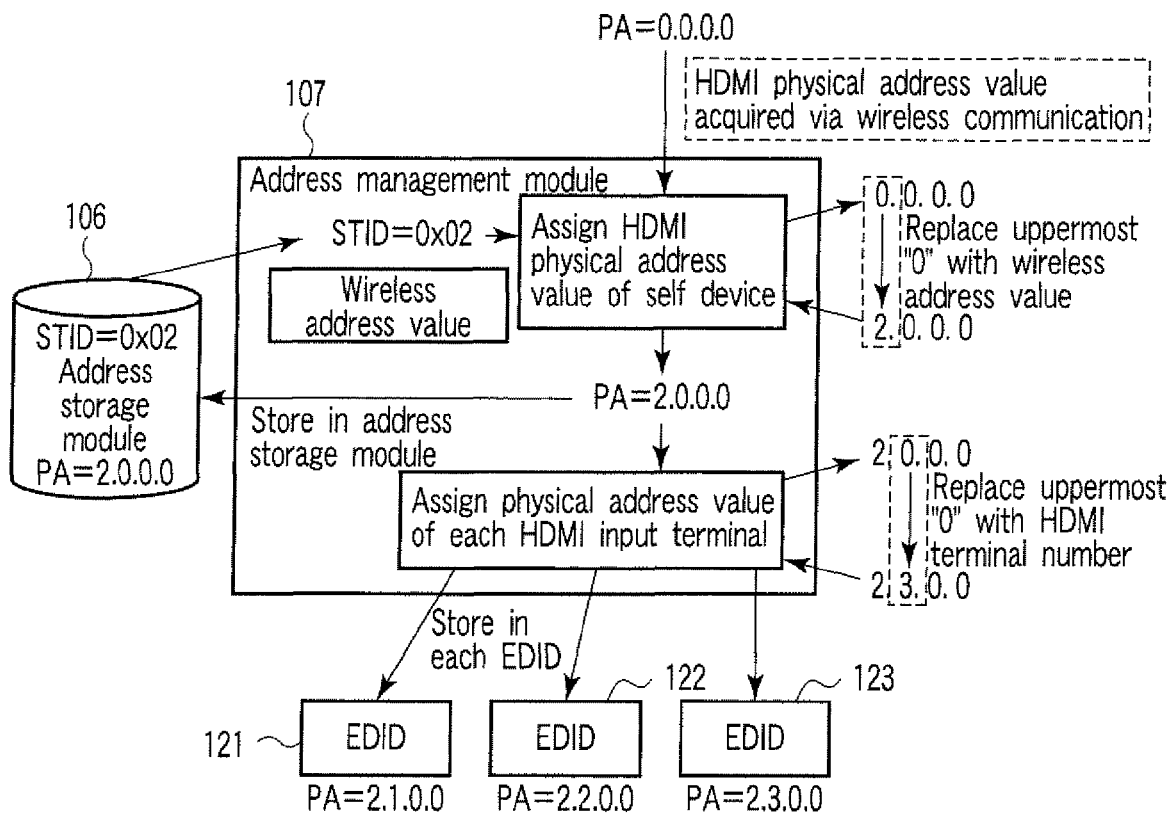
FIG. 6 is a view showing a first address processing method according to the embodiment.

FIG. 6 is a view showing an example of a first address processing method.

The address management module 107 of the transmission apparatus (see FIG. 1) using the communication apparatus according to the embodiment of the present invention assigns a physical address value to the self device based on an STID (=0x02) assigned for wireless communication of the self device and the HDMI physical address value (=0.0.0.0) of an HDMI device located downstream of the transmission apparatus, which is acquired via wireless communication. The assignment is implemented by, e.g., replacing the uppermost bit "0" of the HDMI physical address value acquired from the downstream (for example, if the HDMI physical address value acquired from the downstream is 0.0.0.0, the leftmost bit is the uppermost bit "0", and if the HDMI physical address value acquired from the downstream is 1.0.0.0, the second left bit is the uppermost bit "0") with an STID value. However, since each digit of an EDID has a length of four bits, only 15 STID values of 0x01 to 0x0F are available. As described above, the address assignment method shown in FIG. 6 is simple.

The HDMI physical address value of the self device calculated by the address management module 107 is stored in the address storage module 106 and also used to calculate the HDMI physical addresses of the HDMI input terminals. The HDMI physical address values are calculated by replacing the uppermost bit "0" of the HDMI physical address value of the self device with the terminal numbers of the terminals. The calculated HDMI physical address values are recorded in the EDIDs 121, 122, and 123 corresponding to the terminals.

Figure 11:
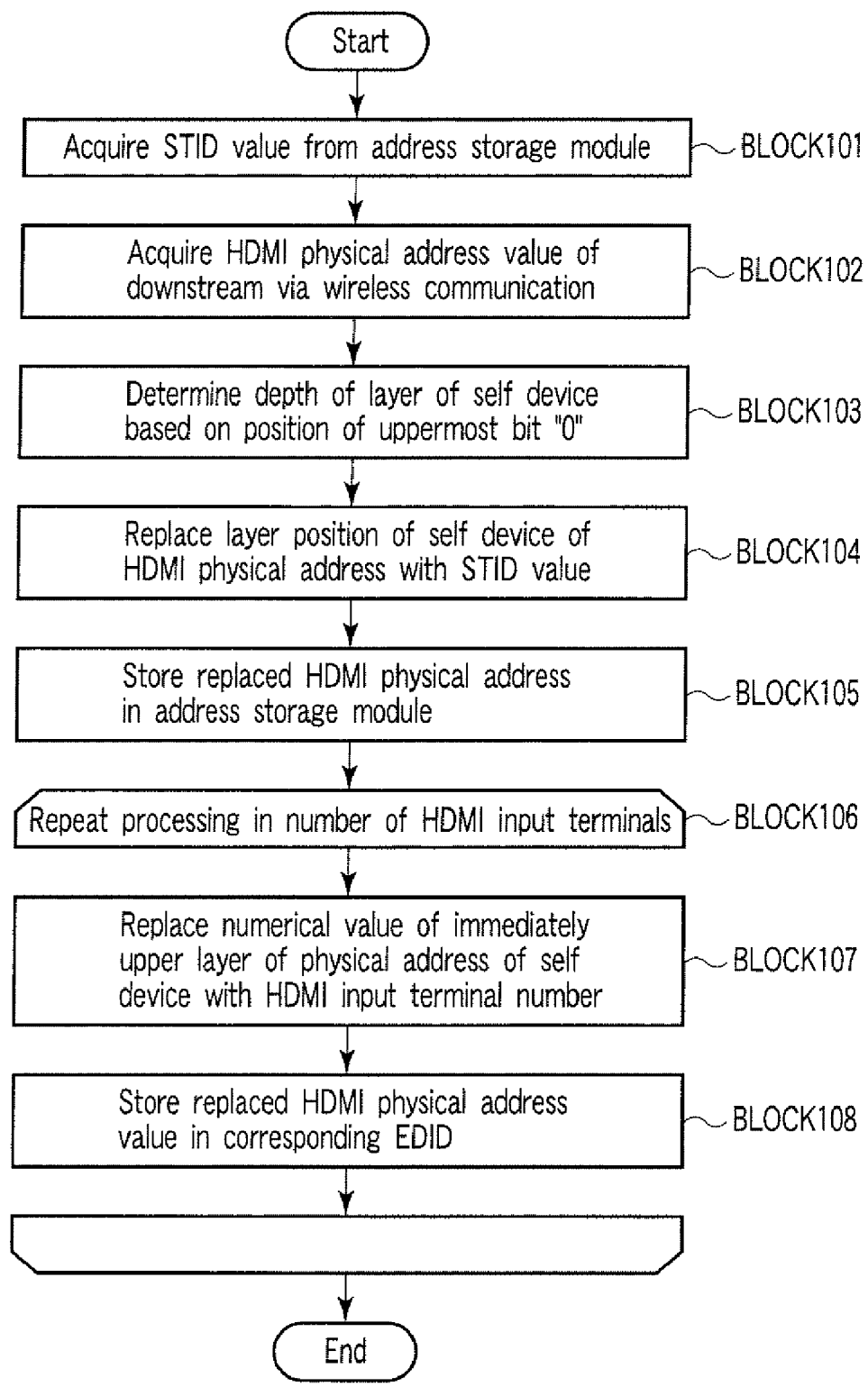
FIG. 11 is a flowchart illustrating the first address processing method according to the embodiment.

FIG. 11 is a flowchart illustrating an example of the above-described first address processing method.

The address management module 107 acquires an STID value from the address storage module 106 (BLOCK101). An STID value is assigned to each wireless device based on an address value assignment method defined by an existing wireless communication method. The address management module 107 acquires an HDMI physical address value from the downstream via wireless communication (BLOCK102). STID value acquisition and HDMI physical address value acquisition may be done in a reverse order or in parallel.

The address management module 107 determines the depth of the layer of the self device based on the position of the uppermost bit "0" of the acquired HDMI physical address value (BLOCK103). The address management module 107 replaces the layer position of the self device in the HDMI physical address value with the STID value (BLOCK104) and stores the replaced HDMI physical address in the address storage module 106 (BLOCK105).

The address management module 107 starts repetitive processing in the number of HDMI input terminals (BLOCK106 to BLOCK108). With the repetitive processing, the numerical value of an immediately upper layer in the physical address value of the self device is replaced with the HDMI input terminal number (BLOCK107). The address management module 107 stores the replaced HDMI physical address value in a corresponding EDID (BLOCK108). The processing for one terminal is thus ended, and the same processing is repeated for the next terminal.

Figure 7:
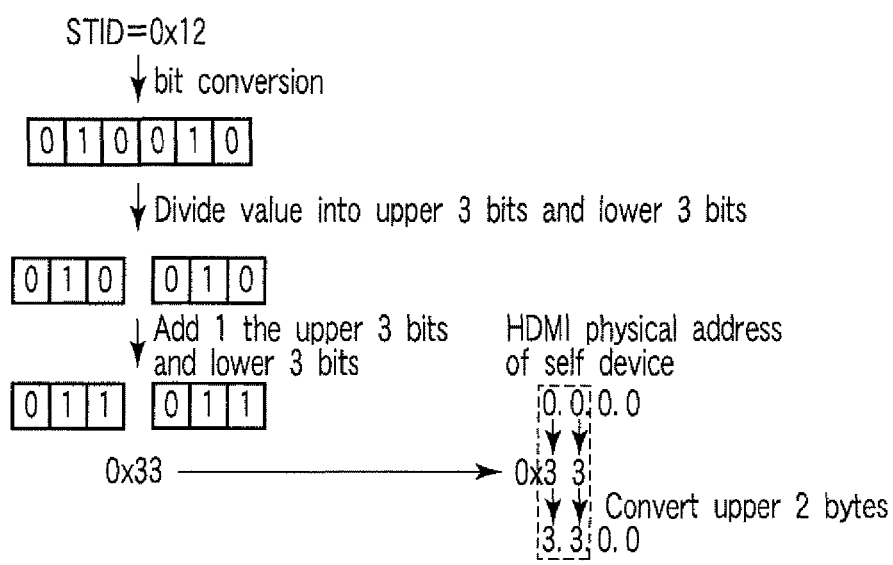
FIG. 7 is a view showing address replacement processing of the first address processing method according to the embodiment.

FIG. 7 is a view showing another example of address replacement processing of the above-described first address processing method.

First, the address management module 107 converts the STID value (6 bits) of the self device into bit values and divides them into upper three bits and lower three bits. The address management module 107 converts the upper three bits and lower three bits not to make "0" appear in the upper three bits and lower three bits. That is, the upper three bits and lower three bits are converted not to make "0" appear in either the third bit of the upper three bits or the third bit of the lower three bits. More specifically, if the third bit of the upper three bits is "0", the address management module 107 replaces "0" of the third bit with "1", thereby generating the upper three bits. If the third bit of the lower three bits is "0", the address management module 107 replaces "0" of the third bit with "1", thereby generating the lower three bits. The conversion processing is not limited to this. If all the three bits are "0", "1" may be set in the third bit (0x0 is converted to 0x8). The address management module 107 sets the thus converted value in the uppermost bit "0" and the next bit "0" of the HDMI physical address value. That is, the upper two bits "0" of the 4-digit HDMI physical address value are replaced with the converted address value. This makes it possible to register an unlimited number of wireless devices. However, since two layers of the HDMI physical address value are consumed, the number of layers of HDMI devices connectable upstream is limited.

Figures 8, 9:
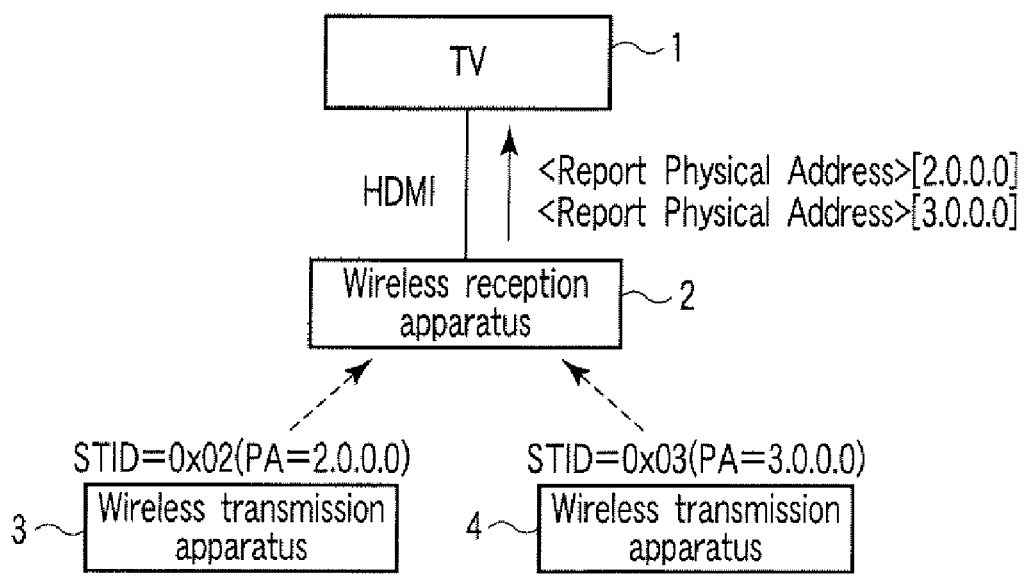
FIG. 8 is a view showing a second address processing method according to the embodiment.
FIG. 9 is a view showing an address notification method according to the embodiment.

FIG. 8 is a view showing an example of a second address processing method. In the second address processing method, an HDMI physical address value is set for the MAC address (and STID) of each wireless transmission apparatus. This allows to set HDMI physical address values without limitation in the range of STID.

Figure 12:
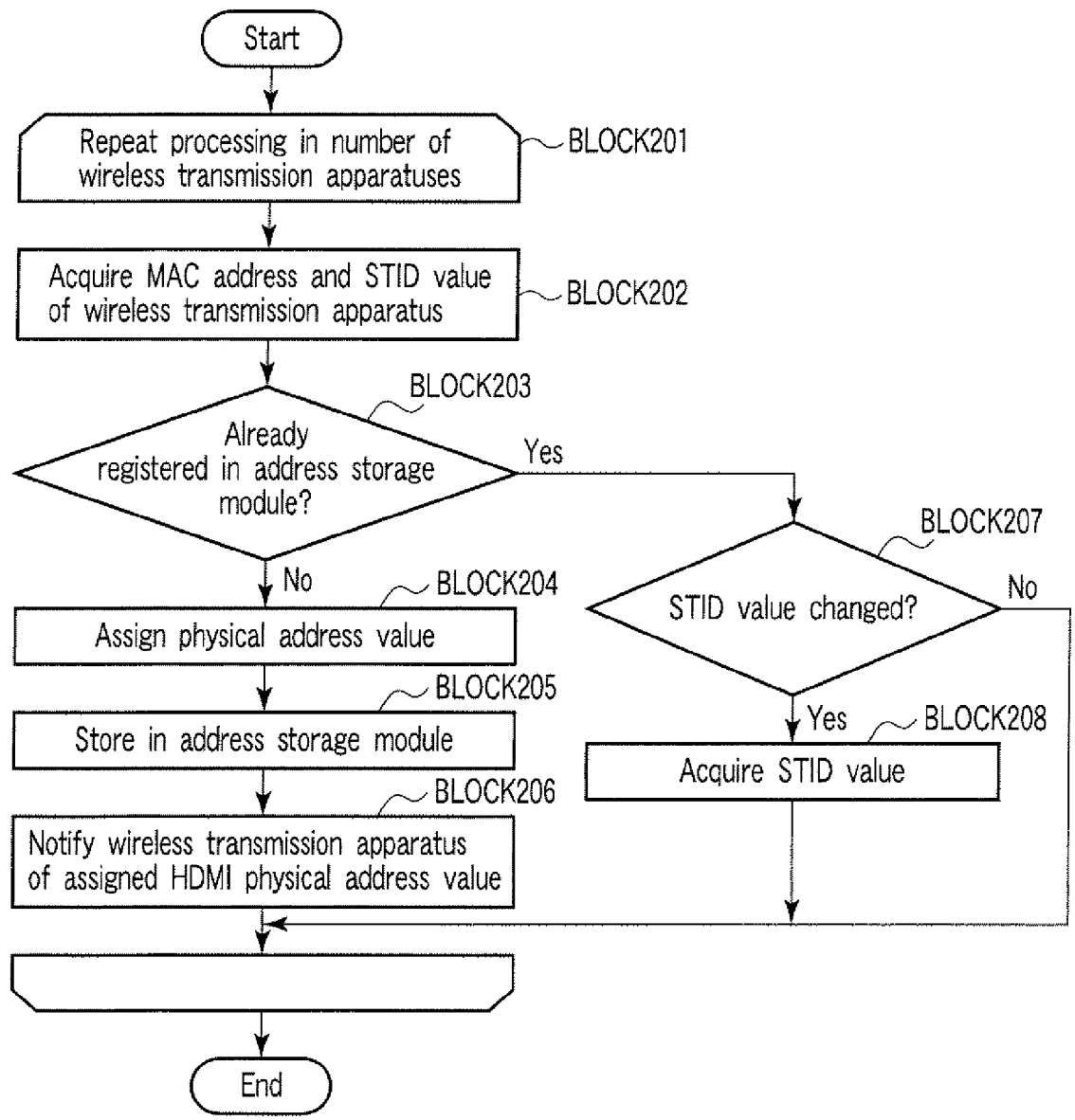
FIG. 12 is a flowchart illustrating the second address processing method according to the embodiment.

FIG. 12 is a flowchart illustrating an example of the above-described second address processing method.

The address management module 107 starts repetitive processing in the number of wireless transmission apparatuses (BLOCK201 to BLOCK208). In the repetitive processing, the address management module 107 first acquires the MAC address value and STID value of a wireless transmission apparatus (BLOCK202). Next, the address management module 107 determines whether the HDMI physical address of the wireless transmission apparatus is already registered in the address storage module 106 (BLOCK203).

If the HDMI physical address of the wireless transmission apparatus is not registered in the address storage module 106 (NO in BLOCK203), the address management module 107 assigns an HDMI physical address to the wireless transmission apparatus (BLOCK204) and stores the assigned HDMI physical address in the address storage module 106 (BLOCK205). The address management module 107 also notifies the wireless transmission apparatus of the assigned HDMI physical address value (BLOCK206).

If the HDMI physical address of the wireless transmission apparatus is already registered in the address storage module 106 (YES in BLOCK203), the address management module 107 confirms whether the STID value has been changed (BLOCK207). If the STID value has been changed (YES in BLOCK207), the STID value is updated (BLOCK208). That is, if the configuration of device connection has been changed, the STID value is updated in accordance with the change.

The processing for one wireless transmission apparatus is thus ended, and the same processing is repeated for the next wireless transmission apparatus.

FIG. 9 is a view showing an example of an address notification method.

The address management module 207 of the wireless reception apparatus 2 receives the HDMI physical address value of the downstream TV 1 via HDMI and receives the STIDs of the upstream wireless transmission apparatuses 3 and 4 via wireless communication. The address management module 207 executes the address assignment processing shown in FIG. 6, 7, or 8 in a reverse order based on the received HDMI physical address value of the downstream TV 1 and the received STIDs of the upstream wireless transmission apparatuses 3 and 4, thereby calculating the HDMI physical address values of the upstream wireless transmission apparatuses 3 and 4. The address management module 207 also notifies the TV 1 of the calculation result by a command (<Report Physical Address>).

Figure 13:
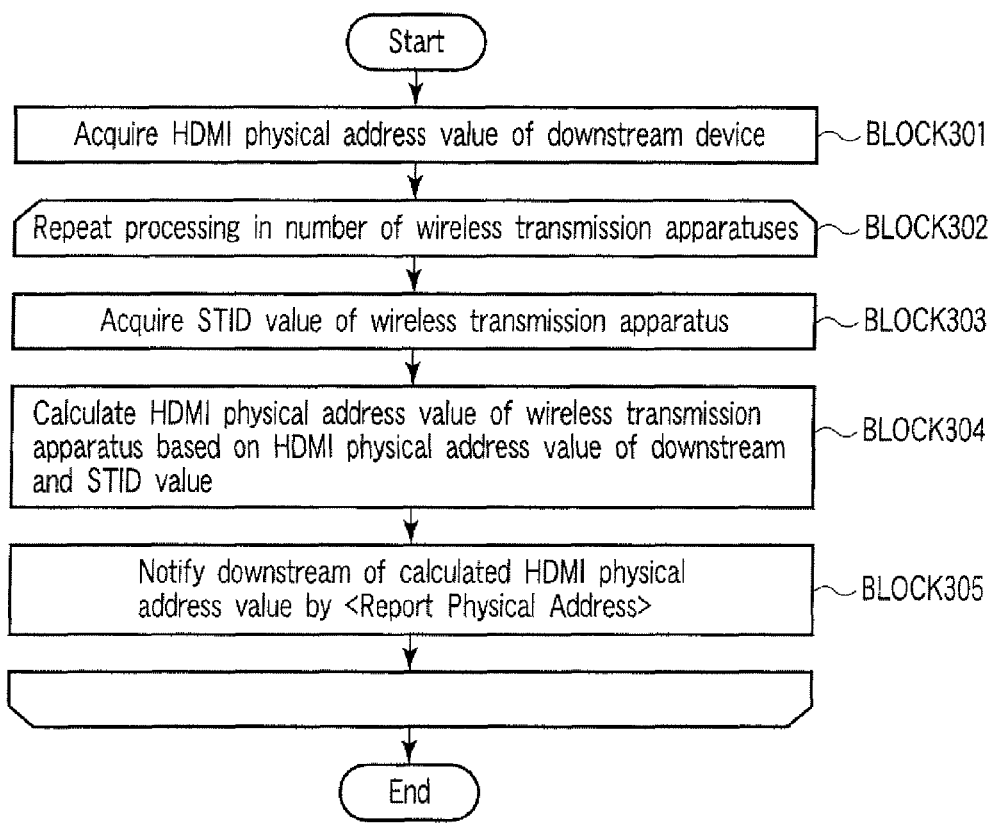
FIG. 13 is a flowchart illustrating the address notification method according to the embodiment.

FIG. 13 is a flowchart illustrating an example of the above-described address notification method.

The address management module 207 of the wireless reception apparatus 2 acquires the HDMI physical address value of the downstream device (TV 1 in FIG. 9) via HDMI (BLOCK301). The address management module 207 then starts repetitive processing in the number of wireless transmission apparatuses (wireless transmission apparatuses 3 and 4) (BLOCK302 to BLOCK305). In the repetitive processing, the address management module 207 first acquires the STID value of an upstream wireless transmission apparatus via wireless communication (BLOCK303). Next, the address management module 207 calculates the HDMI physical address value of the upstream wireless transmission apparatus based on the HDMI physical address value of the downstream and the STID value of the upstream wireless transmission apparatus (BLOCK304). This calculation processing is reverse to the address assignment processing described in FIG. 6, 7, or 8. The address management module 207 also notifies the downstream device of the calculated HDMI physical address value of the upstream wireless transmission apparatus by a command (<Report Physical Address>) (BLOCK305).

The processing for one wireless transmission apparatus is thus ended, and the same processing is repeated for the next wireless transmission apparatus.

Figure 10:
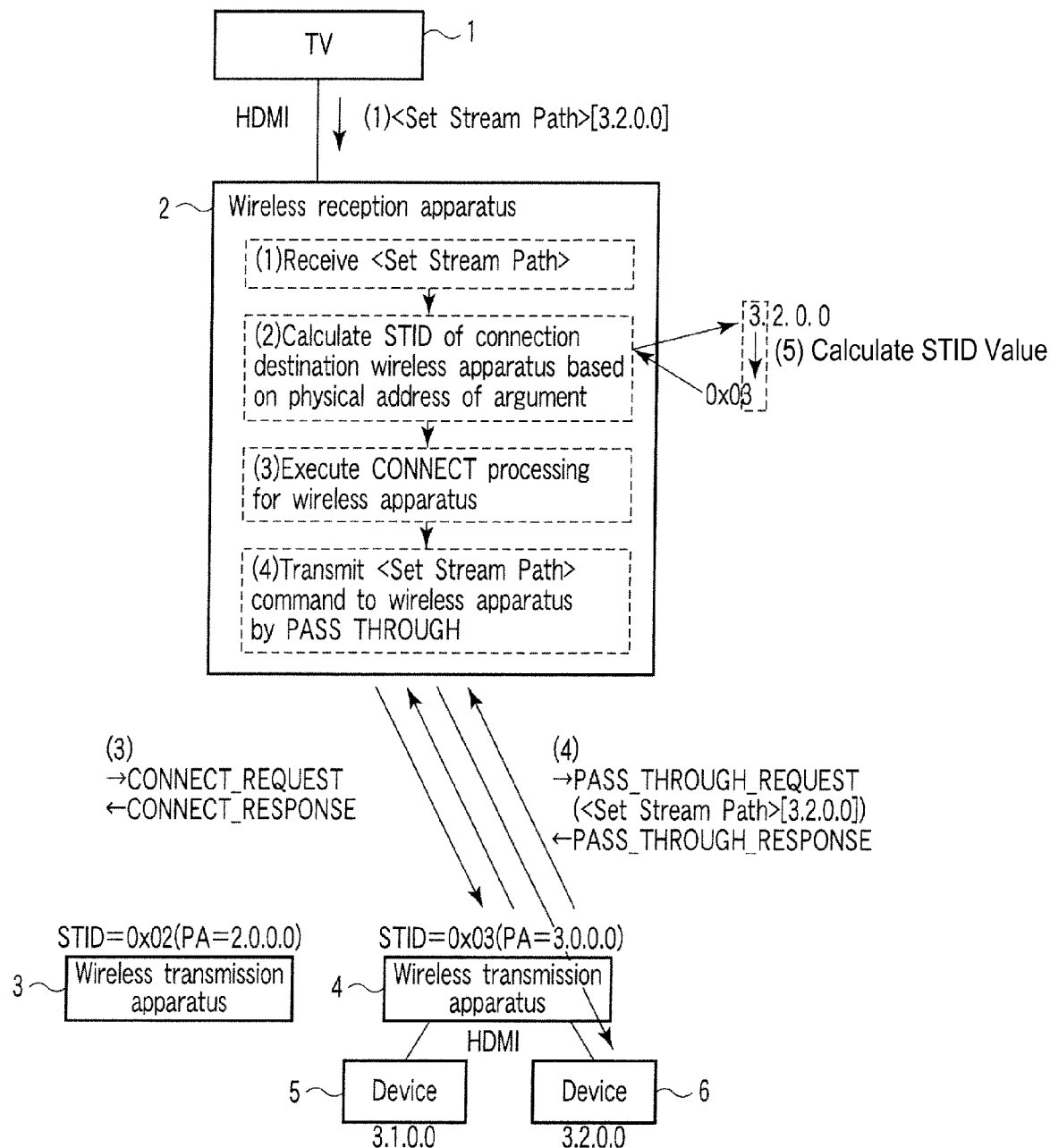
FIG. 10 is a view showing a path switching method according to the embodiment.

FIG. 10 is a view showing an example of a path switching method.

Upon receiving a command (<Set Stream Path>) from the downstream TV 1 via HDMI, the address management module 207 of the wireless reception apparatus 2 calculates the STID value of a wireless transmission apparatus of the wireless connection destination based on the argument contained in the command. That is, it is possible to calculate the STID value of a wireless transmission apparatus of the wireless connection destination based on the argument contained in the command using the address assignment processing described in FIG. 6, 7, or 8. The wireless reception apparatus 2 executes connection processing (CONNECT processing) for the wireless transmission apparatus 4 having the calculated STID value and transmits the received command (<Set Stream Path>) to the same wireless transmission apparatus 4 by PASS THROUGH.

Figure 14:
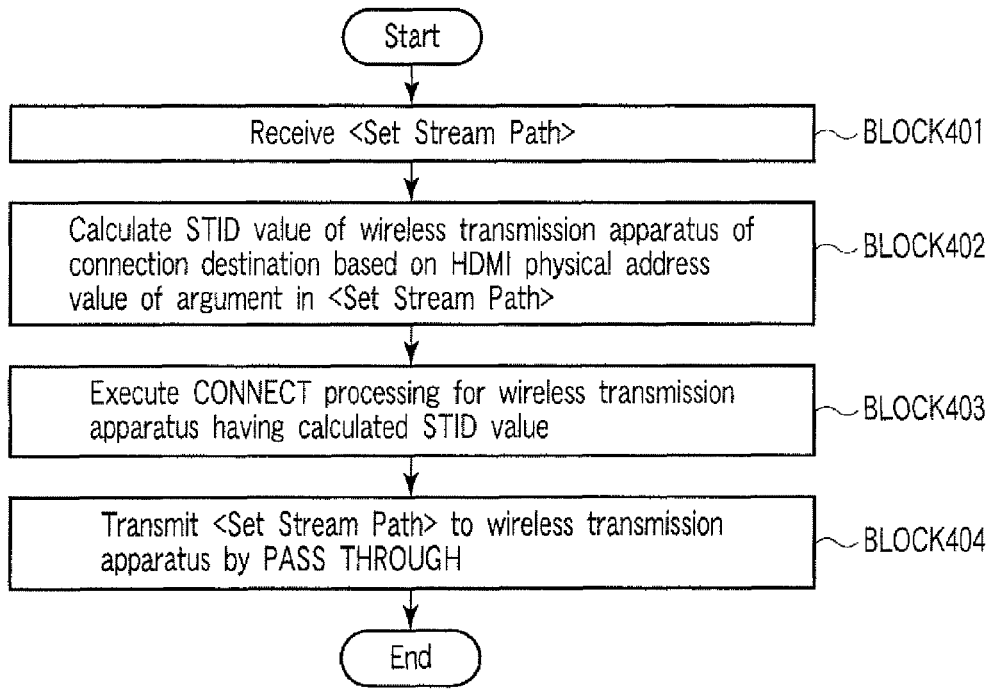
FIG. 14 is a flowchart illustrating the path switching method according to the embodiment.

FIG. 14 is a flowchart illustrating the above-described path switching method.

First, the address management module 207 of the wireless reception apparatus receives a command (<Set Stream Path>) from the downstream device via HDMI (BLOCK401). The address management module 207 calculates the STID value of a wireless transmission apparatus of the wireless connection destination based on the HDMI physical address value of the argument contained in the command using the address assignment processing described in FIG. 6, 7, or 8 (BLOCK402). The wireless reception apparatus executes connection processing (CONNECT processing) for the wireless transmission apparatus having the calculated STID value (BLOCK403) and transmits the command (<Set Stream Path>) to the wireless transmission apparatus by PASS THROUGH (BLOCK404).

The above-described processing allows to support command operations such as video transmission and path switching in an environment where a plurality of wireless devices (Native) connected to no HDMI devices and a plurality of wireless devices (Pass Through) connected to HDMI devices exist, and a plurality of wireless apparatuses exist.

The embodiment will be summarized.

The communication apparatus according to the embodiment of the present invention has a communication module via a transmission path A (wireless HD) and an address assignment module which assigns an address to be used on a transmission path B (HDMI). For example, the address assignment module assigns the address on the transmission path B based on the address on the transmission path A. Alternatively, the address assignment module assigns the address on the transmission path B based on a conversion table.

The above-described communication apparatus also has a module which sends the address on the transmission path B, which is acquired via the transmission path A, to another transmission path B.

The above-described communication apparatus also has a module which establishes a path on the transmission path A upon receiving a path switching request on the transmission path B and transfers the path switching request to another transmission path B from the transmission path A onward.

The various modules of the communication device described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A communication apparatus comprising:
   a first communication module configured to communicate with at least one partner device by a first communication scheme;
   a second communication module configured to communicate with at least one partner device by a second communication scheme; and
   an address management module configured to assign a first physical address value for the second communication scheme to said at least one partner device connected via the second communication module based on an identification (ID) value for the first communication scheme of a self device, which is assigned based on an assignment scheme defined by the first communication scheme.

2. The apparatus of claim 1, wherein the address management module communicates with a first partner device via the first communication module, acquires a second physical address value for the second communication scheme of a second partner device connected to the first partner device by the second communication scheme, and assigns the first physical address value for the second communication scheme to a third partner device connected via the second communication module based on the second physical address value and the ID value.

3. The apparatus of claim 2, wherein the address management module assigns a third physical address value for the second communication scheme of the self device based on the second physical address value and the ID value, and assigns the first physical address value based on the third physical address value.

4. The apparatus of claim 3, wherein the address management module generates the third physical address value by replacing an uppermost value "0" of a 4-digit value included in the second physical address value with the ID value.

5. The apparatus of claim 3, wherein the second communication module includes a plurality of terminals to communicate with a plurality of partner devices, and the address management module generates the first physical address value by replacing an uppermost value "0" of a 4-digit value included in the third physical address value with a terminal number assigned to a terminal connected to the third partner device.

6. The apparatus of claim 3, wherein the address management module converts the ID value into a 2n-bit value, divides the converted 2n-bit value into upper n bits and lower n bits, if a final bit of the upper n bits is "0", generates the upper n bits by replacing the final bit "0" of the upper n bits with "1", if a final bit of the lower n bits is "0", generates the lower n bits by replacing the final bit "0" of the lower n bits with "1", and generates an address value based on the generated upper n bits and lower n bits, and generates the third physical address value by replacing values "0" of upper two digits of a 4-digit value included in the second physical address value with the generated address value.

7. A communication apparatus comprising:

a first communication module configured to communicate with at least one partner device by a first communication scheme;

a second communication module configured to communicate with at least one partner device by a second communication scheme; and an address management module configured to communicate with a first partner device via the second communication module to acquire a first physical address value for the second communication scheme of the first partner device, communicate with a second partner device via the first communication module to acquire a first ID value for the first communication scheme of the second partner device, calculate a second physical address value for the second communication scheme of the second partner device based on the first physical address value and the first ID value, and notify the first partner device of the second physical address value via the second communication module.

8. A communication apparatus comprising:

a first communication module configured to communicate with at least one partner device by a first communication scheme;

a second communication module configured to communicate with at least one partner device by a second communication scheme; and a communication path switching module configured to receive a communication path switching instruction transmitted from a first partner device via the second communication module, connect to a second partner device via the first communication module based on the communication path switching instruction, and transmit, to the second partner device, an instruction to pass the communication path switching instruction, thereby controlling switching of a communication path, wherein the communication path switching instruction contains a physical address value for the second communication scheme of a third partner device connected to the second partner device by the second communication scheme, and the communication path switching module calculates an ID value for the first communication scheme of the second partner device based on the physical address value, connects to the second partner device based on the ID value, and transmits, to the second partner device, the instruction to pass the communication path switching instruction.

* * * * *